United States Patent

[11] 3,587,071

[72] Inventor Charles B. Stegman
8560 Fillbright Ave., Canogo Park, Calif. 91304
[21] Appl. No. 704,145
[22] Filed Feb. 8, 1968
[45] Patented June 22, 1971

[54] TAPE TRANSPORT CONTROL APPARATUS
1 Claim, 8 Drawing Figs.

[52] U.S. Cl. 340/174.1, 179/100.2, 242/75.51, 242/189
[51] Int. Cl. G11b 15/52, B65h 59/00, B65h 59/38
[50] Field of Search 340/174.1 A, 174.1 B, 174.1 K; 179/100.2 K; 242/75.51, 186, 189; 318/312

[56] References Cited
UNITED STATES PATENTS

| | | | |
|---|---|---|---|
| 2,777,964 | 1/1957 | Dimino | 242/75.51 |
| 2,855,160 | 10/1958 | Fundingsland | 242/189 |
| 2,990,484 | 6/1961 | Jones | 242/75.51 |
| 3,064,173 | 11/1962 | Breen et al | 340/174.1 |
| 3,297,266 | 1/1967 | Rumple | 242/186 |

*Primary Examiner*—Bernard Konick
*Assistant Examiner*—Vincent P. Canney
*Attorney*—Roger A. Marrs

ABSTRACT: The tape transport servocontrol apparatus disclosed herein provides a length of magnetic tape extending between a takeup reel and a holdback supply reel trained about an idler roller in alignment with adjacent recording-reproducing heads. A pair of pinch rollers maintain a segment of the tape against the periphery of the idler roller. The takeup reel and the supply reel are motor driven in opposite directions via a pulley arrangement and torque means comprising constant current eddy clutches. Prerecorded tape-speed reference signals are carried on a control drum rotatable in response to rotation of the idler roller and electrical circuit means are employed for adjusting the servo torque of the takeup and holdback reel eddy clutches responsive to a selected track of reference signals on the control drum so that tape speed is regulated thereby.

INVENTOR.
CHARLES B. STEGMAN
BY Roger A. Marrs

CHARLES B. STEGMAN
INVENTOR.

BY Roger A. Marrs

TAPE TRANSPORT CONTROL APPARATUS

BACKGROUND OF THE INVENTION

1. Field of the Invention

This invention relates to magnetic tape transport units and, more particularly, to a novel servocontrol apparatus therefor which allows magnetic tape to progress from the supply reel to the takeup reel employing electrically controlled circuits so as to eliminate the use of a conventional capstan drive for speed control of the tape.

2. Description of the Prior Art

As is well known in the magnetic tape recording field, frequency response is essentially dependent upon two factors: tape speed and the size of the head-gap in the reproducing head. This is because as the wavelength of the recorded signal on the tape approaches the head-gap size, the output signal from the head decreases until it finally becomes zero when they are equal. Actually, a compromise is made in modern instrumentation recorders between tape speed and reproduce-head gap size which is necessitated for several reasons. There is a direct relationship between tape speed and head wear. The higher the tape speed, the shorter the life of the head assemblies. Although the oxide particles on the tape surface are extremely small, their abrasive action on the head surface increases with tape speed. If the reproduce-head gap size is reduced in order to increase frequency response, the output voltage is reduced with a corresponding decrease in the signal-to-noise ratio. A narrower head gap results in faster surface wear and shortened head life.

The evolution of the tape transport from early audio recorders to the present-day instrumentation recorder commences with the basic system wherein the length of tape is pulled from a supply reel by a takeup reel through a series of tape guides and past the record and reproducing heads or a single record-reproduce head. This long loop of unsupported tape led to undesirable tape flutter in the system. Another drawback to this basic method is the large change in tape speed that results since tape tension is not controlled.

An improvement in the basic system is represented by the commonly referred to open-loop drive system wherein the tape movement is controlled by the drive capstan and pinch roller assembly. This constant-speed system is used in most modern audio recorders; however, the need for a more precisely controlled system for instrumentation purposes led to the development of a closed-loop drive system wherein a pair of pinch rollers are employed and a turn-around idler controls the tape both as it enters and leaves the head assemblies and keeps the tape loop very short. Thus, the tape is maintained at a constant tension which lessens the chance of flutter. However, inasmuch as tape movement is under the control of the drive capstan, precision speed control of the tape between the record and playback cycles cannot be precisely assured.

Still another conventional but improved tape transport system is referred to as the zero-loop drive system which eliminates any tape loop between the record and reproduce heads. This requires extremely close tolerances for the manufacture of the drive capstan which doubles as a turn-around idler and associated parts. To combat the presence of flutter in the tape system, an electronic flutter concentration circuit may be included. This system employs a reference signal which is recorded on the tape on a separate channel and later used in the playback process in order to cancel out the effects of flutter. Needless to say, the system still suffers from the drawbacks of a direct driven capstan for controlling the speed of tape movement.

An improved instrumentation recorder employs rotating head assemblies as a solution to the problem of head gap as one way to effectively increase tape speed while maintaining practical head-gap sizes. However, in such an arrangement, it is necessary to provide not only means to move or drive the tape, but also a mechanism to rotate the head assembly. The tape driving means becomes particularly complex and bulky because it is necessary to move the tape as it is wound around a cylinder. In addition, it is also necessary to provide a so-called tracking, automatic control device or means to cause a head to correctly scan over recording tracks on the tape.

Beside the undesirable effects of flutter and wow, instrumentation tape systems conventionally in use are also subject to variations in tape speed, known as drift. This is a gradual process but one that can produce serious errors in timing. Errors of this nature are generally caused by small variations in power source voltage and frequency, although mechanical imperfections can be a contributing factor. A highly regulated power supply is generally employed in the tape transport for reducing this type of error to a minimum. However, it still exists, particularly when storage batteries are employed.

It can been seen from the immediate discussion, that a precision driving source will reduce timing errors caused by power source variations so that a constant frequency and voltage is maintained. However, this will not correct for errors in timing caused by stretching or other deformations of the tape itself. Conventionally, a playback servosystem is effective in reducing this. In such a system, a separate oscillator is used to modulate a control reference signal for one of the recording channels. When played back in the reproduce mode, the signal is demodulated and compared with the reference voltage in a phase comparator. Any error voltage present is used to shift the frequency of the control oscillator to either speed up or slow down the drive capstan. This, in effect, will cause the capstan to reproduce the original error in the same manner produced in the recording process, thereby cancelling it out. Obviously, such a servosystem is expensive and must be incorporated into a direct capstan drive system. Still a further problem encountered in conventional tape transport systems resides in the various tape drive systems so that the tape must be kept under proper tension as it enters and leaves the drive capstan. Improper tension at either point can cause skewing, tape loops or slippage at the drive capstan. In the normal mode of operation, tape is drawn from the supply reel at a rate determined by the speed of the drive capstan and the tension on the takeup reel must be sufficient to prevent a tape loop from forming between the reel and the drive capstan but not so great as to cause slippage of the tape. In typical tape transport systems, the tape supply and takeup reels are driven by torque motors with torque output being a direct function of current input. Such systems are elaborate and stem as a result of the employment of a drive capstan to control the tape movement.

From the foregoing, it can been seen that the speed of tape movement is highly important and that the employment of a drive capstan to control the tape movement involves many problems which require additional mechanisms and electronic circuitry to eliminate or modify the undesirable effects thereof. Therefore, a need has long existed for a tape transport unit in which tape movement is not under the control of a drive capstan but under the drive of a continuously operating motor via a regulated current operating torque means, other than a torque motor.

SUMMARY OF THE INVENTION

Accordingly, the problems and difficulties encountered with conventional tape transport systems are obviated by the present invention which provides a control drum carrying recorded signals in selected tracks and which is driven in response to tape movement past a signal sensor. The sensor is coupled to an eddy current clutch in a motor drive train for driving the takeup reel at a predetermined speed in accordance with the signals in a selected track on the control drum. By employing a second eddy current clutch on the supply reel, a direct drive continuously operating inexpensive motor can be employed for driving both the takeup and supply reels with sufficient torque and completely isolated from the driving motor to effectively tension and brake the reels proportionately.

Electrical circuit means interconnect the sensor with the eddy current clutch of the takeup reel which includes a feedback loop so that a constant biasing current is applied to the clutch to control and stabilize the driving speed of the takeup reel and hence, the speed of tape movement. The circuit means includes a frequency-to-voltage converter which is coupled to the takeup reel eddy current clutch via a voltage comparator and a power amplifier. The feedback network couples the output of the power amplifier to the voltage comparator so that the reference signals from the sensed control drum track can be stabilized when ultimately applied to the clutch in biasing current form. A fine tape speed adjustment may be made by setting a variable resistance in the voltage comparator so that accurate and precise speed control is obtained.

If desired, the eddy current clutches associated with both the supply and takeup reels may be coupled together so that the reference signals on the control drum can be employed for supplying a differential voltage to each of the clutches for more precisely controlling tape tension.

Therefore, it is among the primary objects of the present invention to provide a novel tape transport control apparatus employing supply and takeup reels powered by a continuously operating motor via eddy current clutches wherein the clutch associated with the takeup reel is under the command of an electrical circuit for applying reference signals thereto for tape speed control purposes.

Another object of the present invention is to provide a novel magnetic tape transport unit for transporting the magnetic tape from a supply reel to a takeup reel incorporating electronic controls so as to eliminate the use of a capstan drive for speed control of tape movement.

Another object of the present invention is to provide a novel tape transport unit for instrumentation recorders having a plurality of tracks carrying reference signals which are supplied to the clutches of takeup and supply reels via electrical circuit means so that the speed of tape movement is in direct relationship to the reference signals.

Still another object of the present invention is to provide a novel tape transport unit having circuit means for effecting speed control of tape movement which includes a control drum carrying reference signals which are applied to the clutch mechanism of the takeup reel via a frequency-to-voltage converter, a voltage comparator and a power amplifier so that the current output from the power amplifier may be employed to directly regulate the speed of tape movement.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

DESCRIPTION OF THE PREFERRED EMBODIMENT

Figure 1:
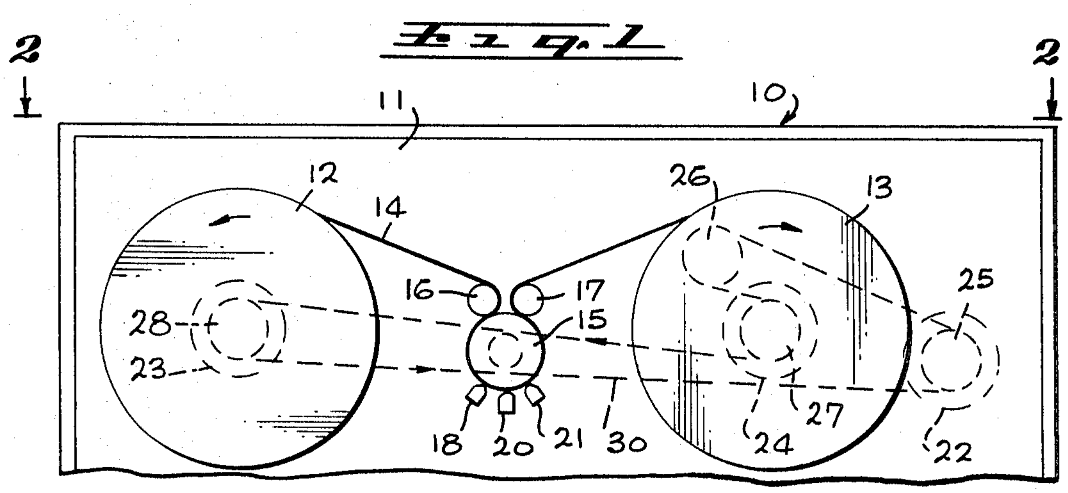
FIG. 1 is a front elevational view of the tape transport servocontrol apparatus of the present invention showing a pulley drive arrangement for operably connecting a drive motor to the tape takeup and supply reels.

Referring to FIG. 1, a tape recorder transport unit is indicated in the general direction of arrow 10 which includes a mounting panel 11 for rotatably supporting a supply reel 12 and a takeup reel 13 on the forward or front surface thereof. The supply reel 12 includes a considerable length of magnetic tape 14 which is trained about the periphery of an idler roller 15 from a pair of pinch rollers 16 and 17. An ERASE head 18, a RECORD head 20 and a PLAY head 21 are mounted on the panel 11 about the idler roller 15 in close proximity to the tape 14 so as to perform their related functions.

The supply reel 12 and the takeup reel 13 are driven by means of a continuously running motor 22 via a pair of eddy current clutches 23 and 24, respectively. A pulley wheel arrangement is provided serving as a drive train which includes a motor pulley 25, an idler pulley 26, a first clutch pulley 27 and a second clutch pulley 28. A suitable cord or belt 30 is trained over the pulley arrangement so as to translate the driving power of the motor 22 into rotary movement of the respective reels. By suitable directional drive arrangement of the cord 30 about the pulley wheels, supply reel 12 is rotated in a counterclockwise direction while takeup reel 13 rotates in a clockwise direction that allows a speed differential taking into account tape buildup or mass on each of the respective reels.

Figures 2, 5, 6:
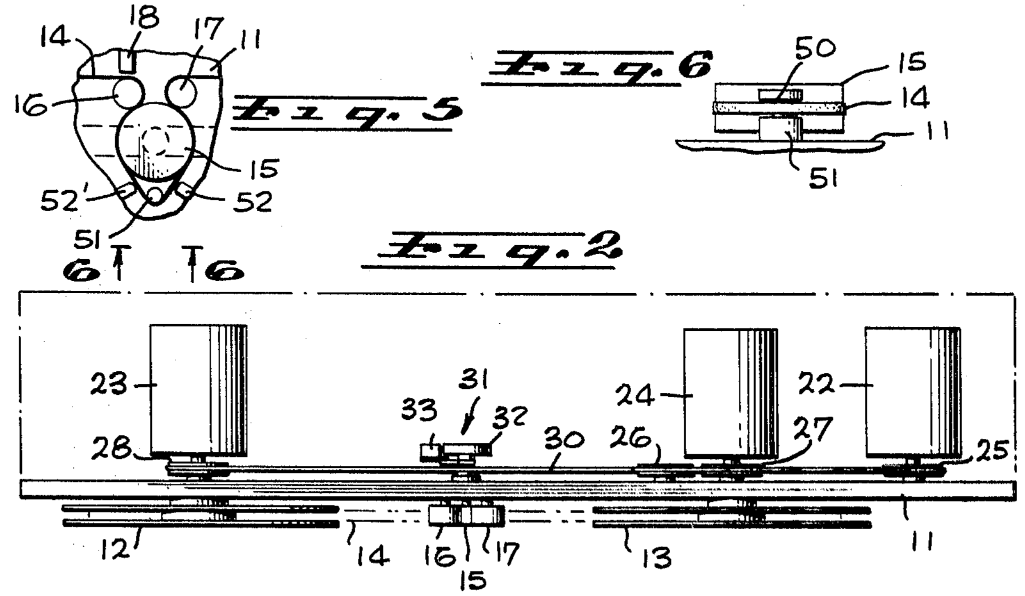
FIG. 2 is a top plan view of the servocontrol apparatus shown in FIG. 1 as taken in the direction of arrows 2–2 thereof.
FIG. 5 is a front elevational view of another embodiment of a tape tension arrangement that may be incorporated into the servocontrol apparatus of FIG. 1.
FIG. 6 is a bottom elevational view of the tape guide employed in the arrangement of FIG. 5 as taken in the direction of arrows 6–6 thereof.
Figure 3:
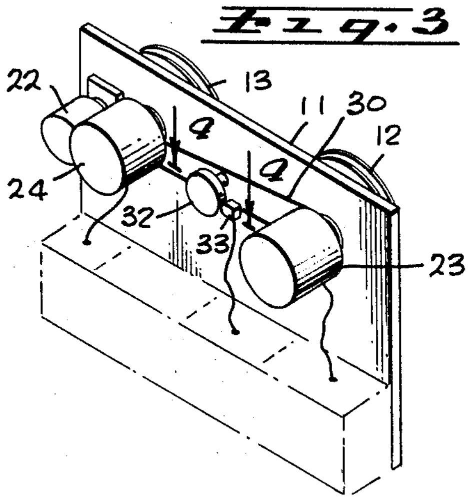
FIG. 3 is a reduced rear perspective view of the servocontrol apparatus illustrating eddy current clutches for applying reel torque and the control drum assembly for storing reference signals in tracks for selectively controlling the speed of tape movement.

Referring now to FIGS. 2 and 3, it can be seen that a speed control drum assembly 31 is disposed immediately behind the idler roller 15 and the pair of pinch rollers 16 and 17. The assembly includes a magnetic drum 32 which is operatively coupled to the idler roller 15 so as to be rotatably driven thereby as the tape 14 engages and moves the idler roller. Also, a magnetic reproduce head 33 is included in the assembly which preferably includes reproducing elements which are arranged in alignment with tracks carried on the periphery of the control drum 32.

Figure 4:
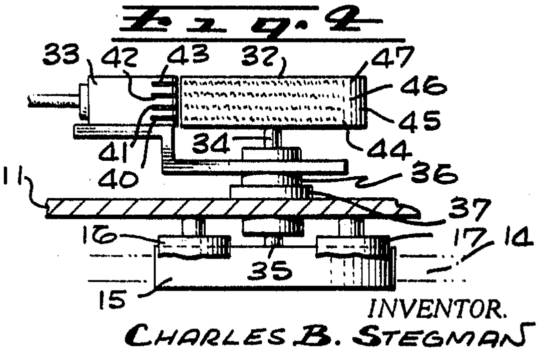
FIG. 4 is an enlarged sectional view of the control drum assembly as taken in the direction of arrows 4–4 of FIG. 3.

Referring now to FIG. 4, additional details of the magnetic drum assembly 31 are shown wherein a drive shaft portion 34 is operatively coupled to a shaft portion 35 connected to the idler roller via a sleeve 36 and a bearing 37. By this arrangement, the rotational movement of the idler roller is translated into rotational movement of the control drum 32. The track reading head 33 is cantilevered in juxtaposition to the periphery of the drum 32 by means of an angled bracket 38 which is suitably carried on the sleeve 36 in fixed relationship therewith. The reproduce or reading elements carried by the head 33 are identified by the numerals 40—43 inclusive and are illustrated in alignment with four signal tracks represented by the numerals 44—47 inclusive. Each of the respective signal tracks comprises a plurality of reference signals magnetically stored on the drum periphery and the reference signals of each track are different in frequency so as to directly relate to at least four different speeds of desired tape movement. However, it is to be understood that additional reference signal tracks may be provided, if desired, and that additional reproduce heads may be provided for sensing the reference signals on the additional tracks.

On one form, the reference signals are recorded on the tracks at 2,500–5,000–10,000 and 20,000 cycles at the respective speeds for each track of 1.875, 15, 3.75 and 7.5 inches per second. The reproduce elements on the head 33 each face a single track so that by suitably electrically switching to any element in the head, any speed track can be selected. It is to be understood that the use of a 2,500 cycle reference signal is exemplary.

Referring now to FIGS. 5 and 6, an alternate form of a tape tension arrangement is illustrated wherein the tape 14 is trained through a slot 50 in a guide 51 carried on the face of the panel 11. The tape 14 is in frictional engagement with the periphery of the idler roller 15 and is effective to cause the roller to rotate as the tape moves between the pinch rollers 16 and 17. However, a portion of the tape is separated from the periphery of the roller, which portion is trained about the guide 51. Located on opposite sides of the guide 51 and in contact with the magnetic surface of the tape, there is provided an erase head 18 and record-reproduce heads 52 and 52'. The heads 52 and 52' are so arranged that their operating surfaces place a tension on the tape between the guide 51 and that portion of roller 15 contacting the tape. This arrangement provides additional tension control on the tape 14 so as to reduce a variety of the undesirable effects mentioned in the discussion concerning prior art.

Figure 7:
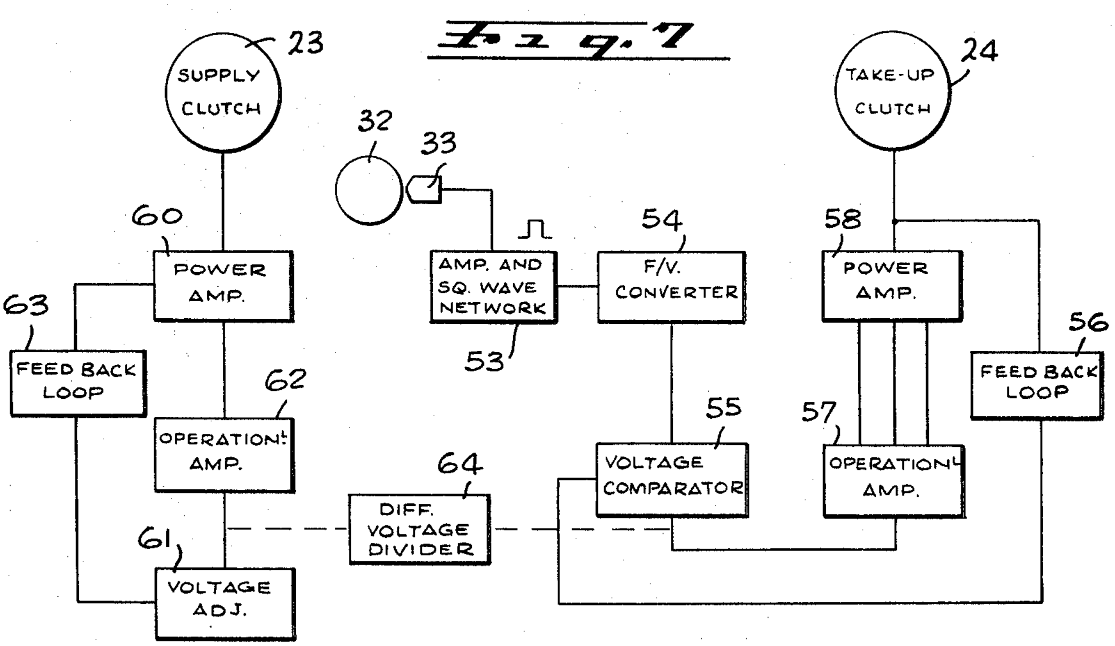
FIG. 7 is a block diagram of the electrical circuit for translating signals on a selected control drum track into control signals for determining takeup and supply reel torque.

Referring now in detail to FIG. 7, a complete servosystem is shown for controlling the speed of tape movement by initially sensing the velocity of the tape. The reference signals in a selected track on the control drum 32 are magnetically sensed by a selected element on reproducing head 33 as the drum rotates past the head and are introduced to an amplifier and square wave network 53. The square wave pulse train output is introduced to a frequency-to-voltage converter 54 and the voltage output thereof is introduced to a voltage comparator 55. The voltage level introduced from the converter 54 is compared with a voltage level introduced to the comparator 55 via a feedback loop circuit 56 and the resultant output of the comparator is supplied to an operational amplifier 57. The amplified voltage level is then furnished to a power amplifier 58 which is employed to directly control the takeup clutch 24 as well as to supply a reference voltage via the feedback loop 56 to the comparator 55. The eddy current takeup clutch 24 is responsive to the output of the power amplifier for supplying more or less torque to the takeup reel 13 according to the current supplied thereto. The eddy current clutches 23 and 24 are typical of such a clutch as more particularly described in U.S. Letters Pat. 3,233,131 and the disclosure therein may be referred to for a detailed description thereof.

Although the system just described relates to the control of torque on the takeup clutch 24, the supply clutch 23 is maintained at a relatively constant torque by means of a power amplifier 60 which directly supplies the clutch with operating current. However, the torque of the clutch may be adjusted within limits by means of a voltage adjust network 61 which supplies an adjusted signal via an operational amplifier 62 to the power amplifier 60. In order to maintain a constant current regulation, a feedback loop network 63 is provided coupling the power amplifier to the voltage adjust network 61. Therefore, once the adjustment has been made in the network 61, the feedback loop 63 will regulate the output of the power amplifier so that a relatively constant torque load is supplied by the supply clutch 23 to supply reel 12.

A modification to the system shown in FIG. 7 may be made when it is desired to couple the regulated current supplied to the takeup clutch 24 with the supply clutch 23. Such modification may take the form of providing a differential voltage divider 64 which is coupled between the output of the voltage comparator 55 associated with the takeup clutch 24 and the voltage adjustment 61 associated with the supply clutch 23. In this embodiment, the supply clutch 23 is maintained at a regulated torque which is determined by the reference signals on the control drum 32. However, the variations in torque supplied in accordance with the reference signals are differentially applied so as to compensate for the increase in tape mass on the takeup reel and the decrease of the mass on the supply reel as the tape coils on the takeup reel.

Figure 8:
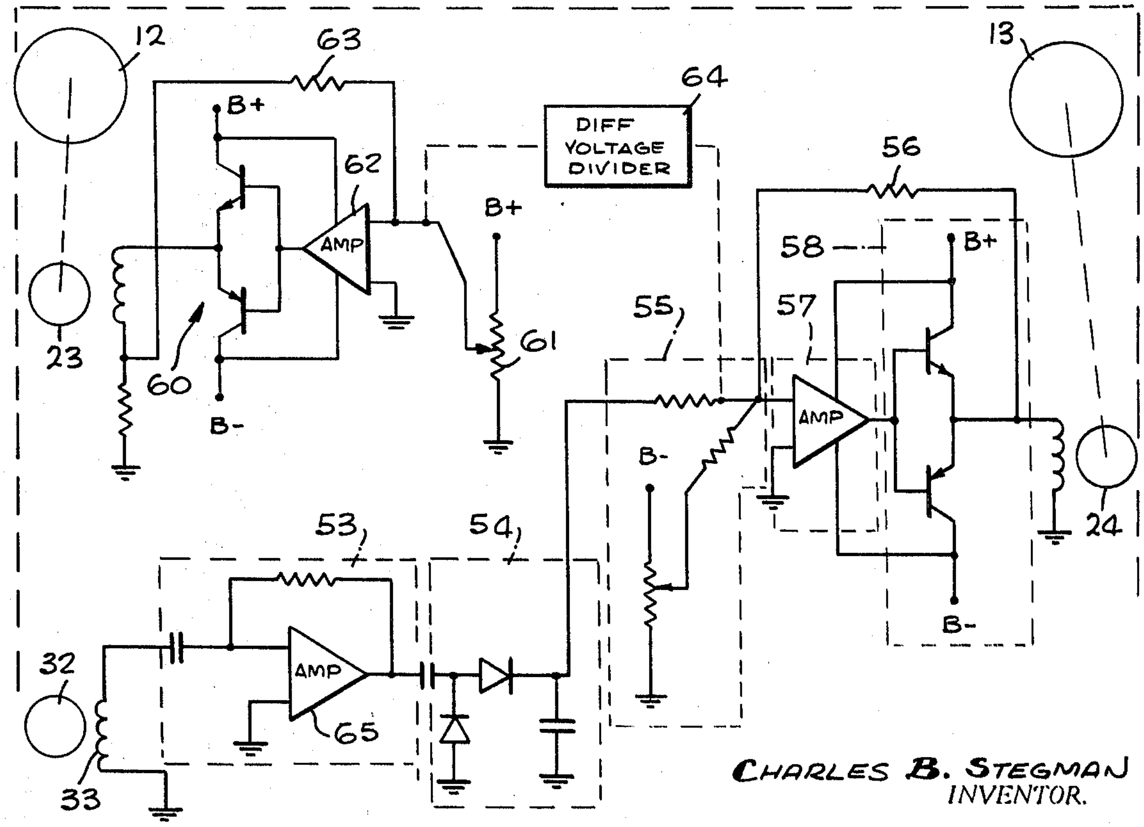
FIG. 8 is a schematic drawing of the electrical circuit shown in the block diagram of FIG. 7.

Referring now to FIG. 8, an exemplary circuit for the block diagram shown in FIG. 7 is illustrated. The reference signals are picked up by the reproduce element of the record head 33 from the control drum 32 and is subsequently fed to an operational amplifier 65, which is overdriven so as to provide a square wave pulse signal output at the frequency of the reference signals. The square wave signal train is then fed into the frequency-to-voltage converter 54, where the output thereof is introduced to the voltage comparator 55 and the operational amplifier 57 and to the power amplifier 58 for supplying a regulated control current to the clutch 24. It is to be noted that a variable potentiometer is included in the comparator circuit 25, which may be readily adjusted at the commencement of tape movement so as to precisely adjust tape movement speed. In one embodiment, the supply clutch is set at a constant braking torque by means of its feedback loop 63 in order to provide sufficient holdback of reel 12 rotation. As the mass of tape is transferred from the supply reel to the takeup reel, varying amounts of current are supplied to the takeup clutch 24 to compensate for the increase in mass.

As mentioned in the preceding description with respect to FIG. 7, the circuit may be modified to include a differential voltage divider 64 connected between the voltage comparator 55 and the input to the operational amplifier 62 so that the clutches 23 and 24 are supplied with a differential control current inversely proportional with respect to each other, wherein as the current supplied to clutch 23 increases, a decrease in current supplied to clutch 23 results.

Therefore, it can be seen that the speed of tape movement is a direct function of the current supplied to the takeup reel clutch 24. As tape movement continues under the driving force of motor 22 via the directional pulley arrangement, idler roller 25 rotates, which movement is translated into rotational movement of the control drum 32. The rotational speed of control drum 32 establishes the frequency of reference signals derived by the reproduce head 33 so that with an increase in rotational speed, the frequency of reference signals increases and, conversely, when rotational speed decreases, so does the reference signal frequency. Any change in frequency of reference signals is reflected in an increase or decrease of voltage level at the output of the voltage comparator 55. Therefore, as the idler roller attempts to increase in rotational speed due to an increase in tape velocity responsive to increased load (diameter of tape on reel) more current is supplied to the takeup clutch so that the supply reel, which is maintained at a constant tension, will act as a brake. When the differential voltage divider 64 is employed, more current will be supplied to the supply clutch and less to the takeup clutch so that the supply reel will adequately tension and brake tape movement.

In essence, it can be seen that the tape transport control apparatus of the present invention provides a unique servosystem, wherein the velocity of the tape is sensed by the idler roller, and the idler roller rotational speed is locked back to tape movement by the control drum and associated circuitry regulating current to the takeup reel clutch. Adequate tape braking, tension, and speed are controlled by the servo loop which is a direct function of tape velocity.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What I claim is:

1. In a magnetic recording and playback system having a tape supply reel and a takeup reel separated by a stationary magnetic head, a tape transport control apparatus comprising:

An idler roller rotatably disposed between said supply and takeup reels in close proximity to said recording head;

a magnetic recording tape extending between said reels and having a portion thereof trained about the periphery of said idler roller in frictional driving relationship therewith for sensing tape speed whereby said tape is supplied from said supply reel to said recording head for storage on said takeup reel;

torque clutches operatively coupled to each of said reels for controlling the rotation thereof;

a continuously operating drive motor;

a pulley arrangement operably connecting said motor to said reels via said torque clutches for driving said reels;

a tape speed control means operably driven by said idler roller and electrically coupled between said idler roller and at least one of said torque clutches for translating tape velocity into control signals adapted to adjust the torque of said torque clutches whereby tape movement is controlled thereby;

each of said torque means comprising an eddy current clutch;

said control means including a control drum rotationally coupled to said idler roller and having a plurality of parallel tracks carried thereon wherein each track includes reference signals prerecorded thereon at a frequency different from said reference signals on an adjacent track;

said control means further including an electrical network coupling said control drum to said torque clutch associated with said takeup reel for converting a selected track of reference signals to a control current for regulating the torque of said takeup reel clutch;

said electrical network including:

a sensing head for deriving said selected reference signals;

an amplifier and square wave network coupled to said sensing head for amplifying and shaping said sensed reference signals;

a frequency-to-voltage converter connected to said last mentioned network;

a voltage comparator coupled to said converter;

amplifier means coupled between said comparator and said torque clutch of said takeup reel;

a feedback loop interconnected between said comparator and said amplifier means;

a second electrical network for regulating the current applied to said torque clutch of said supply reel; and a differential voltage divider interconnecting said second electrical network with said first mentioned electrical network whereby both of said clutches are controlled by said selected reference signals.